United States Patent [19]

Sarma et al.

[11] Patent Number: 5,156,825

[45] Date of Patent: Oct. 20, 1992

[54] ADSORPTION AND ELUTION OF METAL FROM ION EXCHANGE RESIN

[75] Inventors: Srinivasan V. Sarma, Hummelstown; Douglas M. Streed, Harrisburg, both of Pa.

[73] Assignee: AMP Incorporated, Harrisburg, Pa.

[21] Appl. No.: 588,255

[22] Filed: Sep. 26, 1990

[51] Int. Cl.$^5$ .............................................. B01D 15/04
[52] U.S. Cl. ...................................... 423/24; 210/662; 210/670; 210/684; 210/96.1; 210/143; 210/269; 423/DIG. 14
[58] Field of Search ................... 75/723, 736; 210/663, 210/664, 670, 684, 688, 662, 143, 269, 96.1; 423/24, DIG. 14

[56] References Cited

U.S. PATENT DOCUMENTS 4,372,830  2/1983  Law ..................................... 204/110
4,543,169  9/1985  D'Agostino et al. ................ 210/684

OTHER PUBLICATIONS

Technical Sheet from Diamond Shamrock, Duolite A-368, 1981.

Primary Examiner—Ivars Cintins

[57] ABSTRACT

Method and apparatus (10) includes the use of multiple containers (B-1-B-3) containing a weak base ion resin (R) through which plating rinse water (W) is pumped with precious metal such as potassium gold cyanide adsorbed by said resin and then with the cyanide sequentially eluted by potassium hydroxide, water, potassium thiocyanate, water, and the resulting effluent evaporated (at 40) and then chilled (at 44) to remove for reuse the gold and inorganic salt and base.

10 Claims, 1 Drawing Sheet

ADSORPTION AND ELUTION OF METAL FROM ION EXCHANGE RESIN

This invention relates to a method and apparatus for recovering gold in the form of potassium gold cyanide contained in the rinse water used to rinse plated articles in plating and stripping operations.

BACKGROUND OF THE INVENTION

It is standard practice to rinse articles such as electrical terminals or connectors which have been electroplated to remove the chemicals utilized in plating and clean the articles. The resulting rinse water is then treated to remove any residual precious metals for recovery with the remaining effluent passed through appropriate waste treatment A wide variety of mechanical and chemical processes such as dialysis and membrane filters have been tried and are in fact used to treat rinse water from plating operations. These processes work with varying degrees of success in recovery. Typically, processes require many stages of treatment with each stage removing a percentage of the precious metal or compound thereof but complete recovery, limited by the cost of energy and the chemicals used in recovery which in all events should not exceed the value of the recovered material or the cost of alternative disposition of such effluent.

The present invention has as an object the provision of a method and apparatus for recovering precious metals such as gold drag-out from plating and stripping operations in an economic and effective manner. The invention has a further object the provision of a method and apparatus for recovering essentially all of the precious metal found in the rinse water utilized in plating operations. Yet a further object is to provide a simple and compact apparatus for recovering potassium gold cyanide from rinse water in a manner leading to a highly efficient reuse of chemicals and water employed in the process.

SUMMARY OF THE INVENTION

The present invention operates to recover precious metal from rinse water from plating and stripping operations by pumping rinse water through a weak base, ion exchange resin. Thereafter, the metal cyanide anion is extracted from the resin by treating the resin with a solution of an inorganic base followed by treatment with an inorganic salt solution the resultant eluent thereafter being evaporated to a point of the solubility limit of the metal salt which is then crystallized out of solution by chilling. In practice, the apparatus of the invention pumps a rinse solution such as a gold rinse solution through bed columns containing a macroporus weak-base anion exchange resin in the form of a cross-linked polystyrene until the adsorption of metal-cyanide anion by such resin is exhausted as measured by the presence at the outlet of the column of the metal salt such as gold. Thereafter, in a recovery cycle, potassium hydroxide is first pumped through the column in a concentration of 1 molar releasing gold in the form of potassium gold cyanide to a substantial percentage from the resin. The bed column is then flushed with six-bed volumes of water with the resulting solution of potassium hydroxide, potassium gold cyanide, and water then evaporated until the potassium gold cyanide approaches 90 percent of saturation. The water condensate from evaporation is then available for reuse and the remaining solution is chilled whereupon the potassium gold cyanide crystallizes and can be removed. The potassium hydroxide solution being returned for reuse in the recovery cycle for extracting the metal cynadide anion from the resin in the various bed columns. As a final part of the process, the resin in the given bed column is then treated with potassium thiocyanate pumped through the column followed by a six-bed volume flush of water with the resulting solution of potassium thiocyanate, the remaining potassium gold cyanide and water being subsequently collected and evaporated with the condensate water being made available for reuse and the evaporation maintained until the potassium gold cyanide salt approaches saturation in the solution. That remaining solution is then chilled with the potassium gold cyanide salt crystallizing out and the potassium thiocyanate solution is returned for reuse in regeneration of resin. The apparatus of the invention features a plurality of columns with means to detect the presence of gold discharged therefrom as a control to switch columns from lead to lag and to facilitate regeneration of the resin therein. The second step utilizing potassium thiocyanate following potassium hydroxide has been discovered to remove up to better than 95 percent of the potassium gold cyanide from the resin.

IN THE DRAWING

FIG. 1 is a schematic representation of the apparatus of the invention.

DETAILED DESCRIPTION OF THE INVENTION

Figure 1:
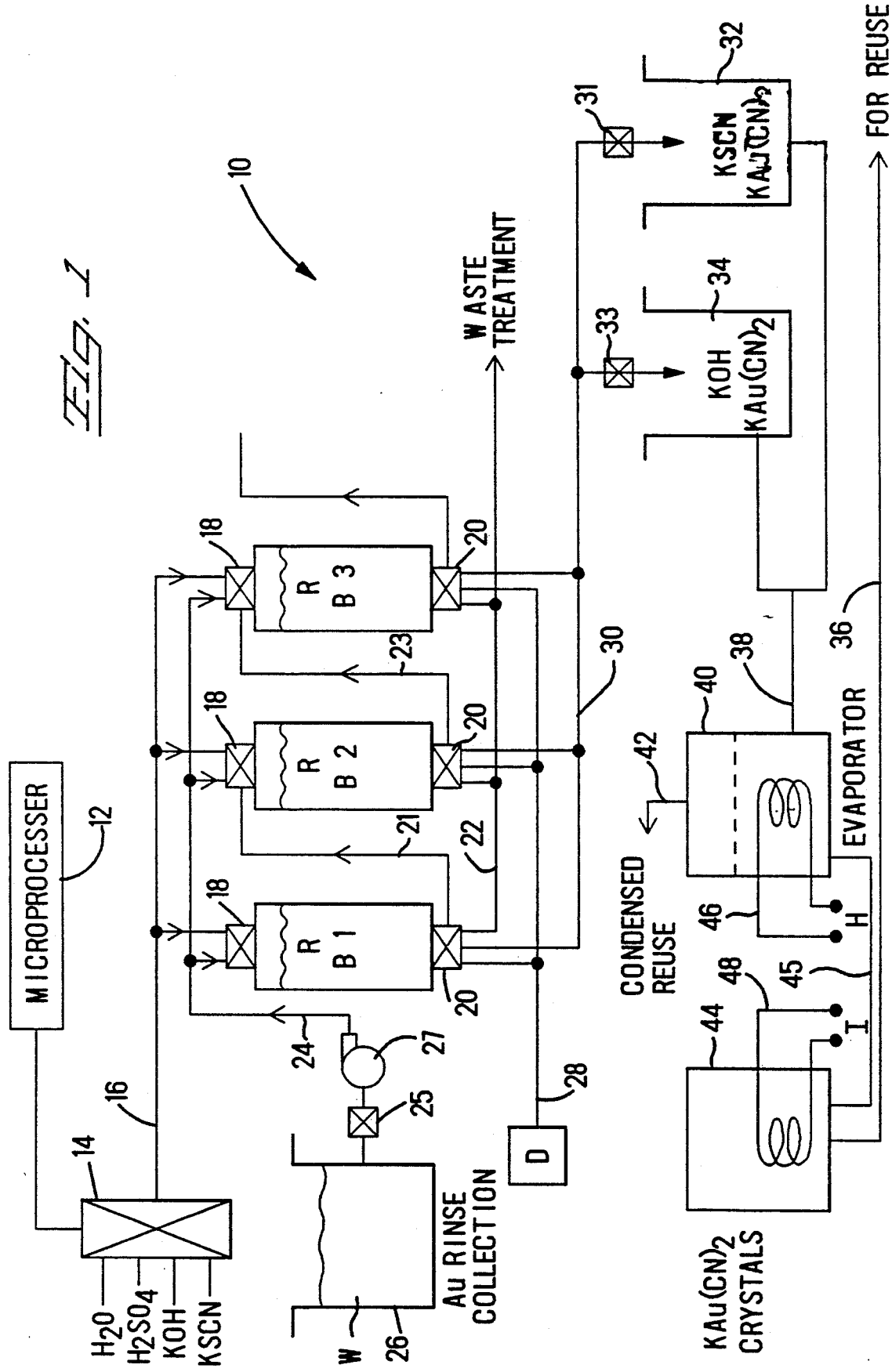

Referring now to FIG. 1, an apparatus 10 is shown to include a microprocessor 12 connected to sequentially and selectively operate a four-way valve 14 having as a supply four separate effluents. These include a source for water, a source for sulfuric acid, and sources for potassium hydroxide and potassium thiocyanate. The outlet from valve 14 connects via a supply pipe 16 to a series of valves 18 each associated with a bed column, three bed columns, B-1, B-2, and B-3 being shown in FIG. 1. The bed columns are, in a typical construction, comprised of large size PVC tubing having dimensions, for example, on the order of 3 inches by 40 inches and each approximately 80 percent filled with a suitable macroporus weak-base anion exchange resin R to be described hereinafter. Each of the bed columns includes an outlet valve 20 connected to an outlet pipe 22 which discharges the effluent into a suitable waste treatment system. The valves 18 further valve an inlet from a pipe 24 in turn valved at 25 and pumped from a reservoir 26 of gold cyanide rinse W by a pump 27. The valves 20 further connect to an outlet pipe 28 which in turn connects to sampling unit shown representatively as D in FIG. 1 including means associated therewith to detect the presence of gold cyanide anion in the effluent discharge through valves 20. Sampling means D can be a sample bottle. A third outlet, pipe 30, connects to each of the bed columns and discharges to one or the other of two reservoirs 32 and 34 via valves 31 and 33; one reservoir containing potassium hydroxide and potassium gold cyanide salt along with water and the other reservoir containing potassium thiocyanate, potassium gold cyanide salt, and water.

The various valves 18, 20, 25, 31 and 33 and pump 27 may be provided with a solenoid action under the control of the microprocessor 12 (through cables not shown) in conjunction with the four-way valve 14.

Each of reservoirs 32 and 34 include an outlet pipe 38 connected to an evaporator 40 suitably heated by a heater 46 to cause the water constituent to evaporate from the solution, the water vapor being condensed and extracted as by a discharge pipe 42. Further shown in FIG. 1 is a reservoir 44 which is made to receive the concentrated residual solution from reservoir 40 which is then chilled by refrigerant 48 until reaching the point of crystallization of the potassium gold cyanide salt whereby the salt solutions being crystallizes and the crystals are removed with the particular inorganic base or salt drawn off via a discharge pipe 36 to be returned to the appropriate supply source for subsequent in the system reuse.

The invention method contemplates a particular operation of apparatus 10 which will now be described. With the bed columns B-1–B-3 filled to an 80 percent level with a suitable resin, for example, Duolite A-368 from Diamond Shamrock Corporation, Cleveland, Ohio, the first step of the cycle initiated by microprocessor 12 is to open valve 14 supplying $H_2SO_4$ via outlet pipe 16 to bed column B-1, valves 18 and 20 being controlled to supply $H_2SO_4$ to B-1, and outlet pipe 22 to sulfate the resin. Thus we have:

$$2\ R_ZNR_2 + H_2SO_4 \rightleftharpoons (R_ZNR_2)_2 \cdot H_2SO_4$$

Next, valve 14 is operated to supply $H_2O$ to bed column B-1 to flush away excess $H_2SO_4$. At least six bed column volumes of $H_2O$ should be passed through B-1. This procedure is repeated with respect to bed columns B-2 and B-3, the flush water being valved via 22 to waste treatment.

Next, microprocessor 12, having closed valve 14, opens valve 25, and operates pump 27 to supply gold rinse solution via pipe 24 to B-1, the valve 18 thereof being opened to supply B-1 and the valve 20 of B-1 being connected to an outlet pipe 21 connecting to the inlet of B-2 and the outlet of valve 20 of B-2 being connected to an outlet pipe 23 supplying B-3. The rinse water will flow through B-1 engaging the resin therein as follows:

$$(R_ZNR_2)_2 \cdot H_2SO_4 + 2KAu(CN)_2 \rightarrow 2R_ZNR_2 \cdot HAu(CN)_2 + K_2SO_4$$

The potassium gold cyanide of the rinse water will, in the process of flowing through B-1, combine with the resin therein, releasing the sulfuric acid constituent. During the pump through of bed column B-1, the output therefrom is monitored via the connecting pipe 28 for analysis by an atomic absorbance unit for the presence of gold ions which presence indicates exhaustion of the resin in B-1. During this time the bed column B-1 serves as a lead column with the columns B-1 and B-3 serving as lag columns. The columns B-2 and B-3 will, of course, be far from exhausted as long as column B-1 is functioning and no gold is detected at D. Upon the detection of gold at D, the valves 18 and 20 of B-1 are operated to close off B-1 to the gold rinse supply and the valves 18 and 20 of bed column B-2 are opened to receive such rinse supply via pipe 24. The bed column B-2 now becomes the lead column with bed column B-3 becoming the lag column.

Bed column B-1 is then treated to provide a regeneration by an appropriate manipulation of valves 14 and the valves 18 and 20 of bed column B-1 to admit first potassium hydroxide to the bed column B-1, the discharge being via pipe 30 into the reservoir 34. At this time the reaction is as follows:

$$R_ZNR_2 \cdot HAu(CN)_2 + KOH \rightarrow R_ZNR_2 + KAu(CN)_2 + H_2O$$

The solution of KOH supplied to B-1 is in a concentration of one Molar which is pumped through the bed column followed by six bed columns of water supplied by manipulation of valves 14 and 33 under control of microprocessor 12. The solution including the potassium gold cyanide, potassium hydroxide, and water is collected in reservoir 34. Next, by an appropriate manipulation of valves 14 and 31 the bed column B-1 is pumped with a one Molar concentration of potassium thiocyanate followed by six bed columns of water, the resulting solution flowing into reservoir 32. This results in the following:

$$R_ZNR_2 \cdot HAu(CN)_2 + KSCN \rightleftharpoons R_ZNR_2 + HSCN + KAu(CN)_2$$

Thereafter, through appropriate manipulation of the valves 14 and 18 and 20 of bed column B-1, a 5 percent solution of sulfuric acid is pumped through B-1 followed by a flushing with six bed columns of water and thereafter B-1 is reinstalled in the process as a lag column until such time as it becomes designated as a lead column upon the exhaustion of the other columns.

The solution in reservoir 34 is then separately pumped by means not shown into the evaporator 40 wherein sufficient heat is supplied at 46 to boil off the water portion of the solutions the water being condensed and taken off via pipe 42 for reuse in the system. The remaining solution is monitored by means not shown until the concentration of potassium gold cyanide in solution approaches saturation as for example, 90 percent of saturation, at which time the residual solution is removed to the reservoir 44 via pipe 45. The solution in reservoir 46 is chilled to the point of crystallization by 48 with the potassium gold cyanide salt crystallizing out and the crystals are removed for reuse in the plating operation. The remaining potassium hydroxide solution is then pumped off for storage via pipe 36 for reuse in the apparatus 10 via pipe 36. An identical procedure is then repeated with respect to the potassium thiocyanate, potassium gold cyanide, and water in reservoir 32.

It has been discovered that the use of only one of either potassium hydroxide or potassium thiocyanate removes no more than 60 or 70 percent of the potassium gold cyanide from the resin and requires a repeating of the step many times over whereas the use of both the base and acid constituents with respect to regeneration achieves a better than 95 percent removal of the potassium gold cyanide transferred to the resin from the gold rinse water.

With respect to the apparatus 10 and the use of the Duolite A-368 resin, a reuse by regeneration may be expected to have a life of about four years. The operating temperature of the fluid system for apparatus 10 should be in the range of room temperature up to 140°. The resin capacity of Duolite A-368 is about 250 tray ounces of gold per cubic foot of resin when operated under ideal conditions, the capacity under more typical operating conditions being from about 100 to 200 tray ounces per cubic foot, depending upon the waste stream.

It is contemplated that other resins having a higher operating capacity, higher resistance to oxidation and in essence being macroporus polystyrene in a cross-length matrix may be employed. Duolite A-368 has an operating pH range of 0 to 9 and a maximum operating temperature on the order of 140 degrees Fahrenheit in the free base form.

It is believed that the invention method and apparatus may be utilized with other precious or noble metals with respect to extraction from rinse water and the like. It is also contemplated that the method and apparatus of the invention may be utilized with respect to extraction of precious and noble metals found in relation to other processes than electrodeposition.

Having now described the invention in terms intended to enable a preferred practice thereof, I now define the invention through the appended claims:

We claim:

1. A method of recovering gold present in the form of gold salts having gold-cyanide anions from rinse water comprising the steps of:
   providing a macroporous weak-base anion resin having sulfate anions adsorbed therein;
   pumping said rinse water through said resin to exchange said gold-cyanide anions for said sulfate anions adsorbed in said resin thereby producing a gold loaded resin;
   eluting a first portion of said gold-cyanide anions from said gold loaded resin with an aqueous solution of an inorganic base thereby producing a first eluent solution;
   eluting a second portion of said gold-cyanide anions from the said gold loaded resin with an aqueous solution of an inorganic salt thereby producing a second eluent solution, and a regenerated anion resin, said regenerated resin being capable of being reused for absorbing sulfate anions;
   removing said gold cyanide anions in the form of gold cyanide salts from said first and second eluent solutions by separately evaporating water from said resultant first and second eluent solution to a point of approaching saturation of a gold cyanide salt formed in said separate first and second eluent solutions to crystalize first and second portions of said gold cyanide salts from said inorganic base and inorganic salt solution;
   recovering said crystallized gold salts; and
   recovering said inorganic base and salt solutions which are capable of being reused.

2. The method of claim 1 wherein said step of providing a resin having sulfate anions adsorbed therein includes to step of rinsing a free base form of a macroporous resin with sulfuric acid followed by a water rinse to remove any excess sulfuric acid.

3. The method of claim 1 wherein said inorganic base solution is a one molar potassium hydroxide solution and said inorganic salt solution is a one molar potassium thiocyanate solution.

4. The method of claim 1 wherein said resin is a tertiary amine.

5. The method of claim 1 wherein a free base form of a macroporous resin is flooded with a 5 percent solution of sulfuric acid whereby said acid is adsorbed on said resin thereby providing said sulfate anions.

6. A method of recovering gold present in the form of gold salts having gold-cyanide anions from rinse water comprising the steps of:
   providing a plurality of bed column containers each charged with macroporous weak-base anion exchange resin having sulfate anions adsorbed therein;
   pumping said rinse water through a first container of said resin to exchange said gold-cyanide anions therein for said sulfate anions adsorbed in said resin and thereby producing a first gold loaded resin, said rinse water being pumped through said first container to a point of exhaustion of said anion exchange resin as defined by the presence of gold-cyanide ions in discharge water from said first container;
   shifting flow of said rinse water to a second container to continue the exchange of said gold-cyanide anions from said rinse water to said resin, thereby producing a second gold loading resin;
   regenerating a macroporous weak base anion exchange resin in said first column by the steps of:
   eluting a first portion of said gold-cyanide anions from said first gold loaded resin with an aqueous solution of an inorganic base thereby producing a first eluent solution and a partially regenerated resin;
   eluting a second portion of said gold-cyanide anions from said partially regenerated first resin with an aqueous solution of an inorganic salts thereby producing a second eluent solution, and a regenerated resin; and
   removing said gold cyanide anions in the form of gold cyanide salts from said first and second eluent solutions by the steps of:
   separately evaporating water from said resultant first and second eluent solutions to a point approaching saturation of a gold cyanide salt formed in said separate first and second eluent solutions;
   separately chilling said evaporated first and second separate solutions,
   crystallizing first and second portions of said gold cyanide salts from said inorganic base and inorganic salt solutions; and
   recovering said crystallized gold salts; and
   recovering said inorganic base and salt solutions which are capable of being reused.

7. An apparatus operable to recover gold dragout from plating and stripping operations, said gold being present in the form of gold salts having gold-cyanide anions from rinse water utilized in plating and stripping operations, the apparatus including:
   at least one container means defining a bed column for an ion exchange resin, said at least one container being charged with a macroporous weak-base anion resin having sulfate anions adsorbed therein;
   means interconnected to said at least one column and operable to pump rinse water therethrough;
   means connected to said at least one column adapted to detect the presence of gold cyanide flowing from said bed column as an indication of exhaustion of said resin;
   means selectively interconnectable to said at least one column for providing at least two solutions for separately eluting said gold-cyanide anions from said at least one column, a first eluent being an aqueous inorganic base solution and a second eluent being an aqueous inorganic salt solution;
   means including first and second further containers for separately collecting respective first and second eluent solutions each having respective first and second portions of said gold-cyanide anions therein;

means to separately evaporate water from said resultant first and second eluent solutions to a point approaching saturation of a gold cyanide salt formed in said separate first and second eluent solutions;

means for separately chilling said evaporated first and second separate solutions to crystalize first and second portions of said gold cyanide salt from said inorganic base and inorganic salt solutions; and means for receiving said crystallized gold salts.

8. The apparatus of claim 7 wherein said bed columns include a series of containers and means are provided to switch flow of said rinse water and said eluent solutions from one container to the next to facilitate recovery of gold cyanide anions in the said container upon exhaustion of the said resin through adsorption of the gold cyanide anions therein.

9. The apparatus of claim 7 including a plurality of pipes interconnecting said one column and said solutions, said column having a series of valves adapted to regulate flow of said rinse water and eluent solutions and control means for controlling operation of said valves to provide a sequenced operation.

10. The apparatus of claim 9 wherein said control means is a microprocessor.

* * * * *

UNITED STATES PATENT AND TRADEMARK OFFICE
CERTIFICATE OF CORRECTION

PATENT NO. : 5,156,825
DATED : OCTOBER 20, 1992
INVENTOR(S) : Srinivasan V. Sarma et al.

It is certified that error appears in the above-identified patent and that said Letters Patent is hereby corrected as shown below:

In the Claims:

Claim 1, Column 5, Line 43 - delete "of".

Claim 2, Column 5, Line 53 - "to" should be --the--.

Claim 6, Column 6, Line 27 - "salts" should be --salt--.

Claim 7, Column 7, Line 11 - "salt" should be --salts--.

Signed and Sealed this

Fifth Day of October, 1993

Attest:

BRUCE LEHMAN

Attesting Officer    Commissioner of Patents and Trademarks